United States Patent [19]

Scott

[11] Patent Number: 5,172,095
[45] Date of Patent: Dec. 15, 1992

[54] VEHICLE DECELERATION ALERT SYSTEM

[76] Inventor: Terrell L. Scott, P.O. Box 354, Harkers Island, N.C. 28531

[21] Appl. No.: 787,548

[22] Filed: Nov. 4, 1991

[51] Int. Cl.[5] .............................................. B60Q 1/44
[52] U.S. Cl. ................................... 340/479; 340/464; 340/467
[58] Field of Search ............... 340/463, 464, 467, 479, 340/430; 307/10, 8; 331/DIG. 3, 57, 143

[56] References Cited

U.S. PATENT DOCUMENTS

| | | | |
|---|---|---|---|
| 3,395,362 | 7/1968 | Sutherland | 331/57 |
| 3,707,702 | 12/1972 | Plattner | 340/430 |
| 3,922,672 | 11/1975 | Birt et al. | 331/DIG. 3 |
| 4,346,365 | 8/1982 | Ingram | 340/479 |
| 4,403,210 | 9/1983 | Sullivan | 340/479 |
| 4,663,609 | 5/1987 | Rosario | 340/467 |
| 4,970,493 | 11/1990 | Yim | 340/463 |
| 4,990,887 | 2/1991 | Lee | 340/479 |
| 5,025,245 | 6/1991 | Barke | 340/479 |
| 5,028,908 | 7/1991 | Juang | 340/475 |

FOREIGN PATENT DOCUMENTS 0100030  6/1984  Japan ..................... 340/479

*Primary Examiner*—Jin F. Ng
*Assistant Examiner*—Brent A. Swarthout
*Attorney, Agent, or Firm*—Rhodes, Coats & Bennett

[57] ABSTRACT

The present invention entails a vehicle brake light system comprising an auxiliary brake light and a deceleration brake light both connected to a current source through a brake switch. A timer control module is operatively connected with the brake switch, auxiliary brake light and the deceleration light for causing the auxiliary brake light to flash "on" and "off" while the brake pedal switch is closed. In addition, the timer control module is operative to cause the deceleration light to flash "on" and "off" for a predetermined period after the brake pedal switch assumes an open state.

15 Claims, 2 Drawing Sheets

VEHICLE DECELERATION ALERT SYSTEM

FIELD OF THE INVENTION

The present invention relates generally to vehicle brake lights and more particularly to a control circuit for controlling vehicle brake lights

BACKGROUND OF THE INVENTION

Vehicle brake lights have been mandated since the 1920's. Conventional brake light systems for vehicles include rear mounted brake lamps which are illuminated whenever the brake pedal is depressed and which are "turned-off" when the brake pedal is released. The actuation of the brake lamps is controlled by a brake switch which is mechanically linked to the vehicle's brake pedal. The brake pedal switch controls current flowing to one or more brake lights on the vehicle to warn following drivers that the vehicle is being braked.

Despite the presence of brake lights to warn drivers, a relatively large number or rear end collisions continue to occur. To help stem this problem, Congress recently enacted new legislation requiring an auxiliary, centrally located brake lamp to be placed at approximately eye level with respect to the drivers in the trailing vehicles. These new centrally located brake lamps are intended to increase the visibility of the brake light and reduce rear end collisions. Nevertheless, rear-end collisions are a continuing problem.

It has been proposed in the past to "flash" the brake lights to more effectively attract the attention of drivers in the trailing vehicles. One such system is disclosed in U.S. Pat. No. 4,663,609 in which depression of the vehicle brake pedal causes the brake lights to flash intermittently in order to attract the attention of the driver in a trailing vehicle. However, the brake lights only flash while the brake pedal is depressed. Similar systems are disclosed in U.S. Pat. No. 5,028,908 to Juang, and U.S. Pat. No. 4,403,210 to Sullivan.

These prior art brake lighting systems do not address the potentially hazardous situation that exists when a momentarily slowed vehicle is re-accelerated. When the brake pedal is released, the driver in the following vehicle is likely to begin accelerating his vehicle as well. If the driver in the leading vehicle suddenly brakes while the driver behind is accelerating, then the chances of a rear end collison are greatly increased. One possible solution to this problem is disclosed in U.S. Pat. No. 4,990,887 to Lee. A brake light system is disclosed in which brake lights are illuminated continuously as long as the brake pedal is depressed and for a predetermined duration after the brake pedal is released. This system will cause the driver in the trailing vehicle to delay prior to accelerating thereby decreasing the chances of a rear end collision. However, the brake signal is ambiguous since the driver of the trailing vehicle is unable to determine when the braking action of the leading vehicle is discontinued.

SUMMARY AND OBJECTS OF THE INVENTION

The present invention overcomes the disadvantages and limitations of the prior art by providing a dual warning light system in which a first warning light remains on while the brake pedal is being depressed, and a second warning light which turns on when the brake is released and continues to remain on for a pedetermined period. Both lights are preferably, but not necessarily, flashed while the brakes are being applied and for a predetermined interval thereafter. The advantages of this system are: (1) the normal brake and turn signal lights are unaffected and will continue to indicate when the brakes are applied; and (2) the auxiliary brake lights will flash or pulse alerting other drivers that the subject vehicle is or has been braked, decelerated or stopped.

The present invention is based on a dual timing system powered by the vehicles battery system and activated by a deceleration signal derived from the braking signal or other deceleration detectors. The timer module is activated and held "on" during deceleration or braking. On terminatioin of the deceleration or the release of the brake pedal, the timer control element decays through an RC network and disables in 4 to 6 seconds as set by a potentiometer. The second or dependent timer has a fixed period of approximately 1 second with 50% duty cycle.

It is therefore an object of the present invention to provide a vehicle brake light system that informs a trailing vehicle that the leading is decelerating or has just experienced a braking condition.

A further object of the present invention is to provide a brake light system for a vehicle that (1) provides a flashing brake light signal in response to the brake pedal of the vehicle being depressed and (2) upon the release of the brake pedal provides a continuous flashing light for a selected period of time.

Still a further object of the present invention resides in the provision of a brake light system of the character referred to above that is relatively simple in design.

Another object of the present invention resides in the provision of a brake light system of the character referred to above that is provided with an auxiliary brake light and a deceleration brake light and wherein the brake light system is provided with control means for causing the auxiliary brake light to flash in respose to the brake pedal of the vehicle being actuated, and further, to cause the deceleration light to be actuated and to flash for a selected time period in response to the brake pedal being released.

Other objects and advantages of the present invention will become apparent and obvious from a study of the following description and the accompanying drawings which are merely illustrative of such invention.

DETAILED DESCRIPTION OF THE INVENTION

Figure 1:
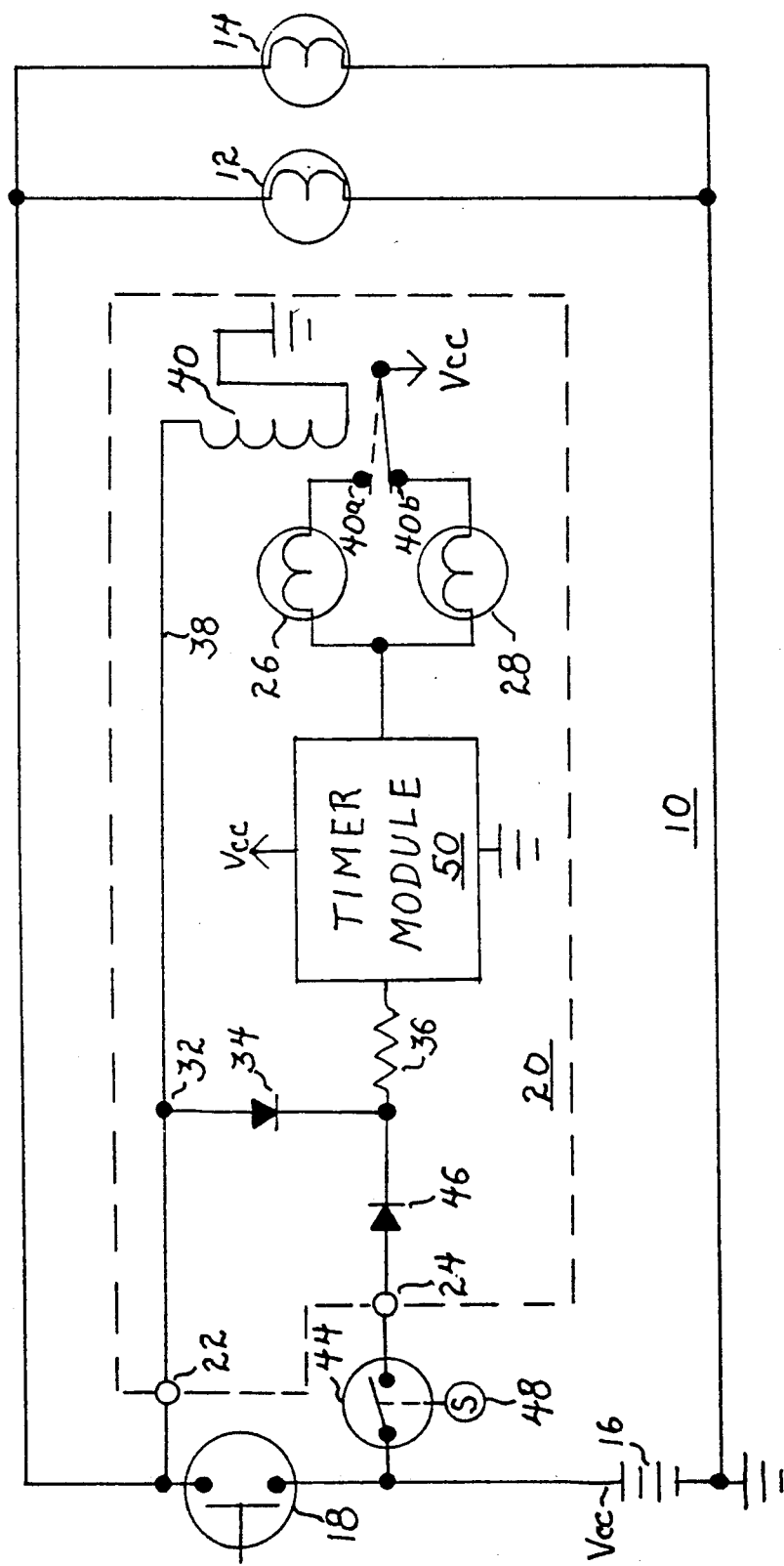
FIG. 1 is an electrical schematic showing the brake system of the present invention.

Referring now to the drawings, and particularly to FIG. 1, the brake light system of the present invention is shown for differentiating braking and deceleration actions. The brake light system 10 includes a rear panel brake lights 12 and 14 connected in a conventional manner with a car battery 16 and brake pedal switch 18. Whenever the brake pedal switch 18 is closed by depressing the brake pedal of the vehicle, current is directed through the brake lights 12 and 14 which will illuminate and remain illuminated until the brake pedal switch 18 is opened.

An alert system 20 is connected by lead 22 to the conventional brake light system. The alert system 20 includes an auxiliary brake light 26 and a deceleration signal light 28. In late model vehicles, the auxiliary brake light 26 is controlled by the brake pedal switch 18 in the same manner as the rear panel brake lights 12 and 14. In the present invention, the auxiliary brake light 26, as well as the deceleration signal light 28 are both controlled by a timer control module which will be hereinafter described in greater detail.

Referring now to the alert system control circuit 20, it will be noted that whenever brake pedal switch 18 is closed, power is supplied to the control circuit 20 via lead 22. The input current generates an enabling signal at node 32. The enabling signal is applied to the input of the timer module 50 via the isolating "OR" diode 34 and input resistor 36 to activate the timer module 50. Current is also directed through line 38 to a relay switch 40 causing the relay to make contact with switch contact 40a. The relay switch 40 directs a 12 volt d.c. current to the auxiliary brake lamp 26 causing it to illuminate. While brake lamp 26 is illuminated, the timer module 50 generates a pulse signal at node 42 which causes the lamp 26 to flash "on" and "off" intermittently. When the brake switch 18 is opened, relay switch 40 is deactuated causing the relay to make contact with switch contact 40b. As will be hereinafter described in greater detail, the timer module 50 will continue to produce a pulse signal at node 42 for a fixed period after the brake is released. As a result, deceleration lamp 28 will continue to flash intermittently 4 to 6 seconds after the brake pedal is released. It is evident, therefore, that when a braking signal occurs, the auxiliary brake lamp 26 is energized and that when the braking signal stops the deceleration lamp 28 is energized and will continue to flash for 4 to 6 seconds. The dual signal provides an unambiguous indication of the status of the leading vehicle.

A separate deceleration signal, independent of the brake signal could optionally be applied to the circuit through lead 24. Switch 44, which is actuated by a deceleration signal, directs current through input "OR" diode 46 and the input resistor 36 to the timer. The deceleration signal can be derived from numerous sources, such as an accelerometer, a manifold pressure detector for detecting a drop in the intake manifold pressure, a means for detecting alternator output frequency or ignition firing frequency, or a means to detect a decrease in tachometer voltage. The isolating diode 34 prevents the relay switch 40 from being actuated by the deceleration signal. As a result, current is directed to deceleration lamp 28 which will remain on and flash intermittently as long as the deceleration signal is present and for a predetermined period thereafter as hereinafter explained. Should a braking signal occur while a deceleration signal is already present, the relay switch 40 will redirect the current through the brake lamp 26 which will remain on as long as the brake signal is present. When the brake signal ceases, the deceleration signal light 28 will again illuminate and remain "on" until 5 seconds after all braking and deceleration signals cease.

Figure 2:
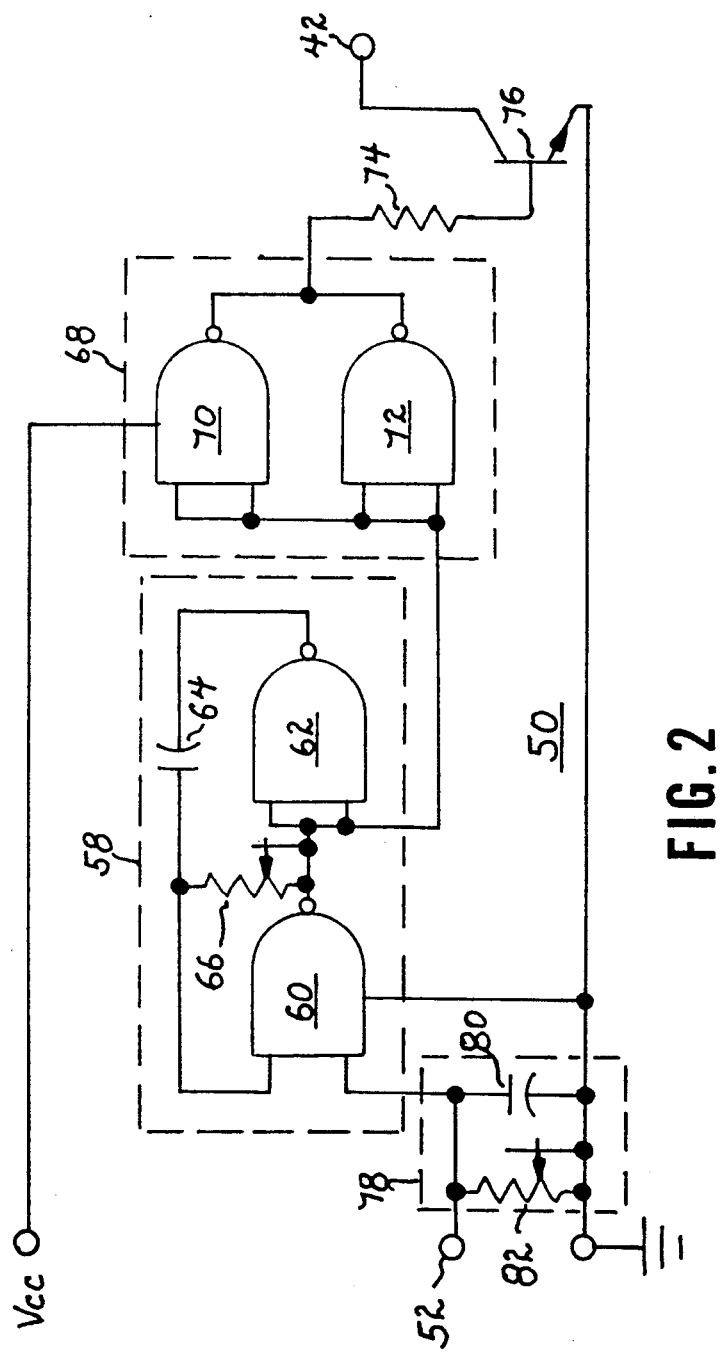
FIG. 2 is an electrical schematic of the timer module shown in FIG. 1 in which forms a part of the brake light system of the present invention.

Referring now to FIG. 2, a schematic diagram of the timer module 50 is shown. The timer module 50 receives power on line 52 whenever a brake signal or deceleration signal is received as previously described to actuate an oscillator circuit indicated generally at 58. The oscillator circuit 58 comprises a pair of CMOS NAND gates 60 and 62, capacitor 64, and a variable resistor 66. The oscillator circuit 58 becomes active on receipt of an enabling signal at node 52, which is produced by a braking or deceleration action. The NAND gate 60 detects the voltage at input 52 and becomes active when this voltage rises to approximately VCC/2. Further, the NAND gates 60 and 62, and varible resistor 66, form an RC multi-vibrator with a period of approximately ½ to 1 second as determined by the value of resistor 66. The output of the oscillator circuit 58 is derived from the output terminal of NAND gate 60. This output is equal to Vcc when the oscillator circuit is inactive but falls rapidly to 0 on receipt of an enabling signal at input 52. As long as the enabling signal is present, the oscillator circuit 58 will produce a pulse signal at its output which is applied to an amplifier circit 68. The amplifier circuit 68 consists of two NAND gates 70 and 72 which are connected in parallel. The NAND gates 70 and 72 function as a phase inverting driver amplifier which inverts the pulse signal from the oscillator circuit. The inverted pulse signal from the amplifier circuit 68 is applied through limiting resistor 74 to the base of driver transistor 76. The emitter terminal of the NPN transistor 76 is grounded so that the transistor 76 acts as a current switch which is driven by the pulse signal from the amplifier circuit 68. On receipt of a signal at 52, the base of the transistor 76 is pulled positive instantaneously for approximately ½ to 1 second. The transistor 76 is subsequently pulsed "off" and "on" as long as the oscillator circuit 58 remains active.

The circuit also includes a delay timer circuit indicated generally at 78 which comprises capacitor 80 and variable resistor 82. The function of the delay timer circuit is to keep the oscillator circuit 58 active for a fixed duration after the enabling signal at input 52 ceases. When the enabling signal is present at the input of the timer control module 50, the capacitor 80 is fully charged. As long as the enabling signal is present at 52, the capacitor 80 will remain charged and the oscillator circuit 58 will remain active. On termination of the enabling signal, resistor 82 discharges the capacitor 80 which continues to activate the oscillator circuit 58 for a predetermined time period determined by the values of the capacitor 80 and resistor 82. When the voltage at the capacitor 80 falls to approximately VCC/2 (in approximately 5 to 6 seconds) the oscillator circuit 58 is disabled and the output voltage of the oscillator circuit 58 goes to a high logic state which in turn causes the dependent lamps to turn off. Thus, it will be appreciated that the timer control module will remain active and flash the deceleration signal lamp 28 "on" and "off" for a period of approximately 5 to 6 seconds after the enabling signal ceases.

The present invention may, of course, be carried out in other specific ways than those herein set forth without departing from the spirit and essential characteristics of the invention. The present embodiments are, therefore, to be considered in all respects as illustrative and not restrictive and all changes coming within the meaning and equivalency range of the appended claims are intended to be embraced therein.

What is claimed is:

1. An auxilliary signal light system for a vehicle having main braking lights and turn signal lights comprising:
   (a) a source of direct current;
   (b) an auxilary brake light connected to said direct current source;

(c) a deceleration signal light connected to said direct current source and operable independently of said turn signal lights;

(d) a brake switch for producing a brake signal connected between said direct current source and the auxiliary brake light and deceleration signal light; and (e) timer control module means operably connected with said brake switch, auxiliary brake light, and deceleration signal light for actuating the auxiliary brake light on in response to the brake switch being closed while maintaining the deceleration signal light in an off state, and for actuating the deceleration signal light for a predetermined time period only in response to the brake switch being opened.

2. The brake lighting system according to claim 1 wherein said timer control module includes an oscillator circuit responsive to said brake signal to generate a pulse signal for causing the auxiliary brake lamp and deceleration signal light to flash intermittently.

3. The brake lighting system according to claim 2 wherein said timer control module includes a delay timer off circuit for powering said oscillator circuit after the cessation of the brake signal at the input to the timer control module.

4. The brake lighting system according to claim 3 wherein said oscillator circuit comprises a first NAND gate for receiving at one of its inputs an enabling signal produced by the closing of the brake switch, a second NAND gate connected to the output of the first NAND gate, a feedback line connected between the output of the second NAND gate and one input of the first NAND gate, a capacitor disposed in the feedback line, and a resistor connected between said feedback line and the output of said first NAND gate.

5. The brake lighting system according to claim 4 wherein said resistor is a variable resistor.

6. The brake lighting system according to claim 4 wherein said delay timer off circuit is connected to the input of said first NAND gate.

7. The brake lighting system according to claim 6 wherein said delay timer off circuit comprises a second capacitor connected to the input of said first NAND gate which is charged when an enabling signal is present, and means for discharging the second capacitor when the enabling signal ceases to continue powering the oscillator circuit for a predetermined time period.

8. The brake lighting system according to claim 7 wherein said discharge means comprises a resistor connected in parallel with said second capacitor.

9. The brake lighting system according to claim 8 wherein said resistor is a variable resistor.

10. The brake lighting system according to claim 1 further comprising a deceleration detection means connected between said direct current source and said timer control module so as to bypass said brake switch, said timer control module being responsive to said deceleration signal to cause the deceleration signal lamp to flash "on" and "off".

11. An auxiliary brake lighting system for use in a vehicle having main braking lights and turn signal lights comprising:

(a) an auxiliary brake light mounted on the vehicle;

(b) a deceleration signal light mounted on the vehicle and operable independently of said turn signal lights;

(c) brake switch means operatively connected to the vehicle's brake pedal for actuating the auxiliary brake light when a brake pedal is depressed and deactuating the auxiliary brake light when the brake pedal is released; and (d) delay timers means operatively connected to said brake switch means and the deceleration signal light for actuating the deceleration signal light when the brake pedal is released and maintaining said deceleration signal light in an "on" condition for a predetermined period only after the brake pedal is released.

12. The auxiliary brake lighting system of claim 11 including means for flashing both the brake light and the deceleration signal light while each assumes an "on" state.

13. The auxiliary brake lighting system of claim 12 including a pair of conventional brake lights in addition to the auxiliary brake light and the deceleration signal light.

14. The auxiliary brake lighting system of claim 11 further including an oscillator circuit responsive to said brake switch means for generating a pulse signal for causing the auxiliary brake light and deceleration signal light to flash "on" and "off" in response to the brake switch mean being actuated.

15. An auxiliary signal light system for a vehicle having a primary signal light system including a brake switch responsive to the operation of a brake pedal by the driver, source of direct current, primary brake lights connected to said direct current source and responsive to the brake switch for indicating when the vehicle is being braked, and turn signal lights connected to said direct current source for indicating when the vehicle is being turned, said auxiliary signal light system comprising:

(a) an auxiliary brake light connected to said direct current source and responsive to the brake switch for indicating when the vehicle is being braked, said brake lights being turned "on" when the brake switch is closed, and turned "off" when the brake switch is open;

(b) deceleration signal light independent of the turn signal lights connected to said direct current source and responsive to the opening of the brake switch, said deceleration signal light being turned "off" while the brake light is turned on, and being turned "on" for a predetermined time period only after said brake switch is opened; and (c) a timer control module operatively connected to the deceleration signal light for turning said deceleration signal light "off" when said predetermined time period has expired.

* * * * *